Nov. 26, 1935.  E. L. KNOWLES  2,022,042
FISHING REEL
Filed Dec. 7, 1934   3 Sheets-Sheet 1
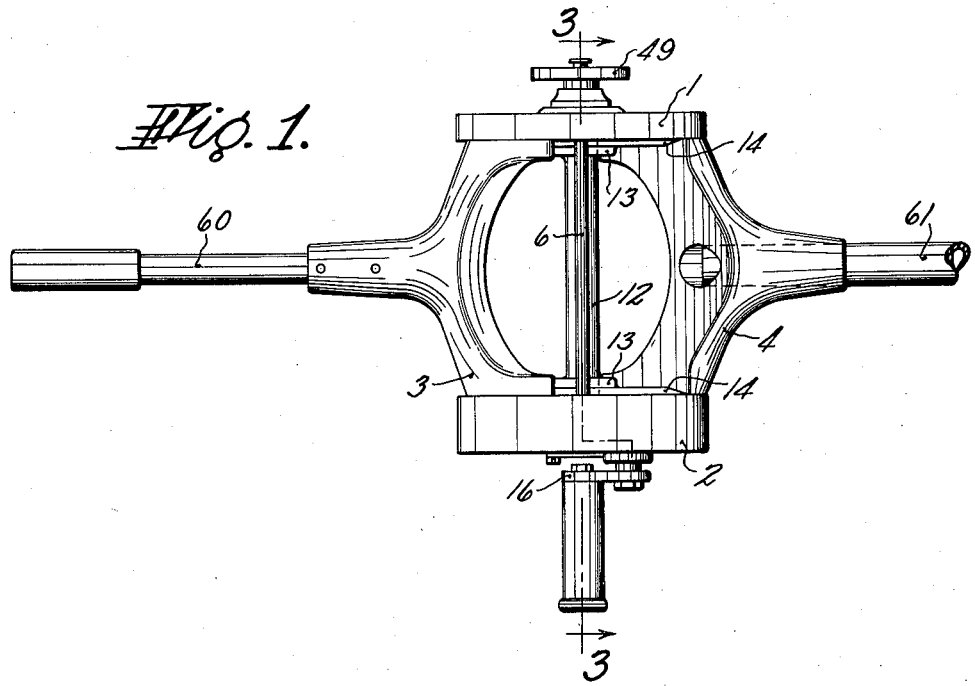
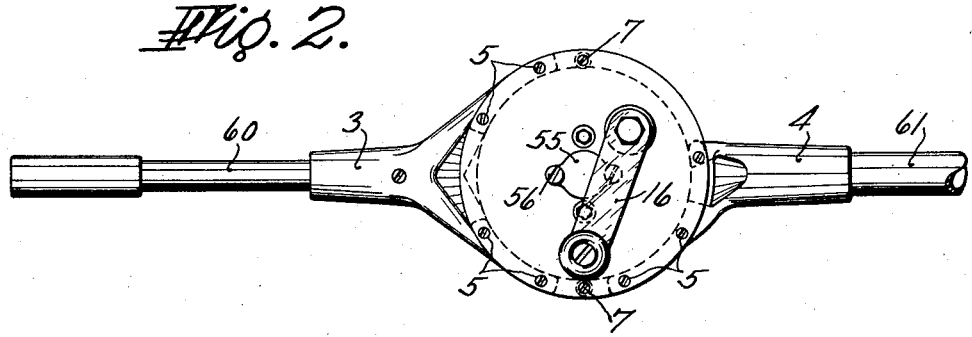
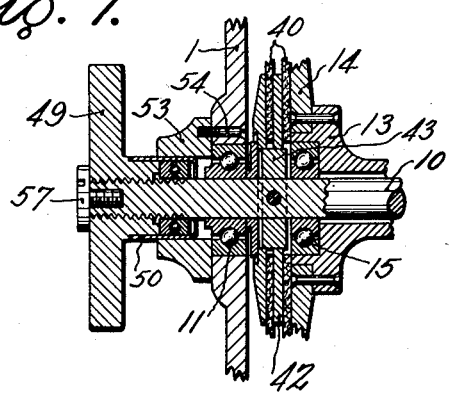
INVENTOR
ELWIN L. KNOWLES
BY Chapin + Neal
ATTORNEYS

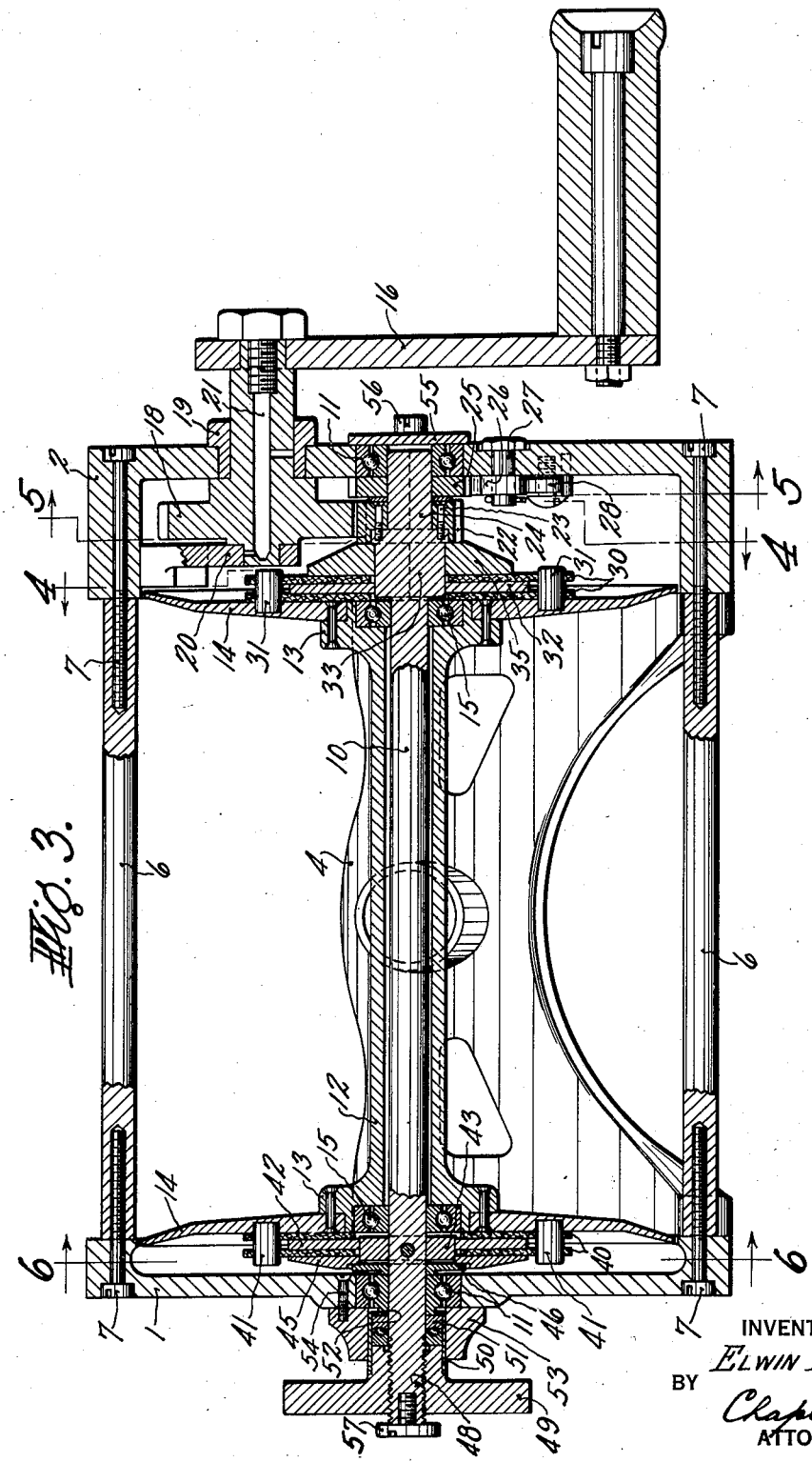

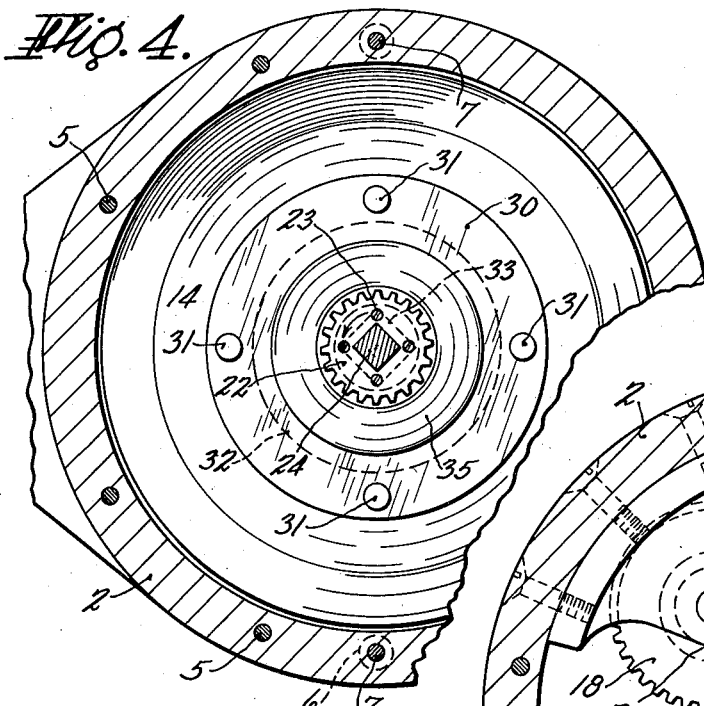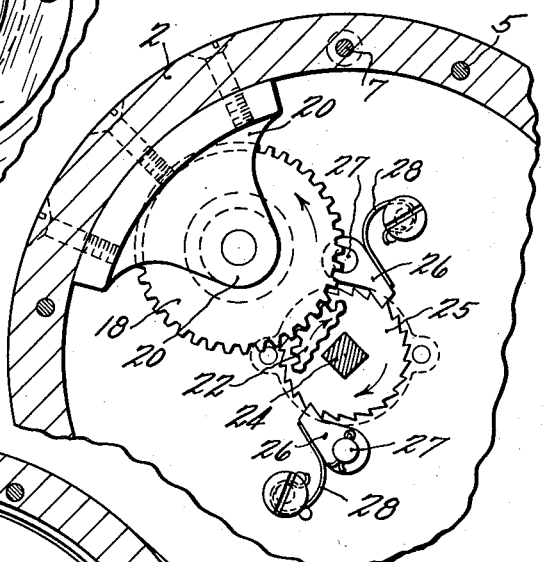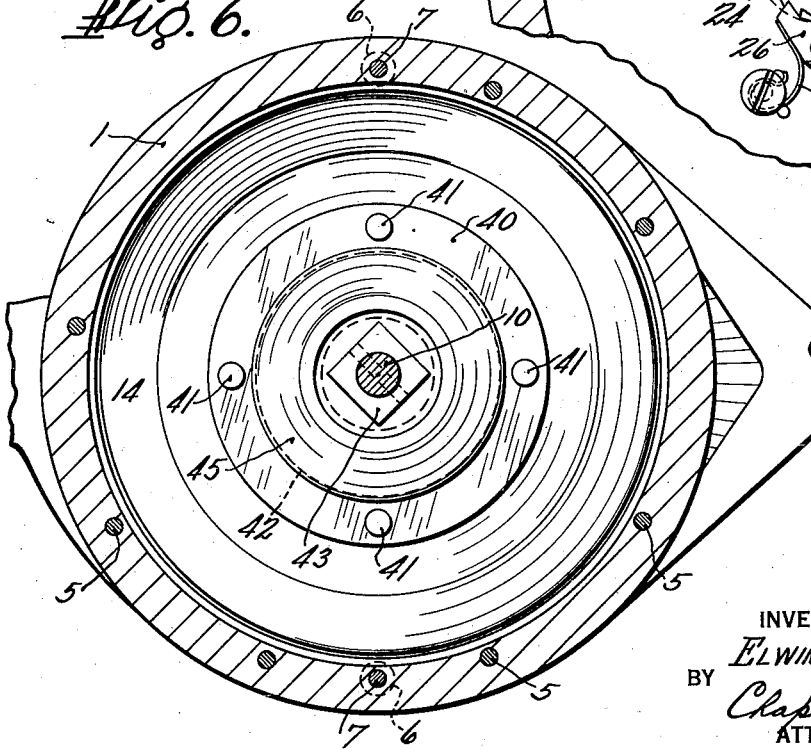

Patented Nov. 26, 1935

2,022,042

UNITED STATES PATENT OFFICE 2,022,042

FISHING REEL

Elwin L. Knowles, Miami, Fla.

Application December 7, 1934, Serial No. 756,493

3 Claims. (Cl. 242—84.5)

This invention relates to fishing reels and more particularly to reels for use in taking large deep sea fish such as tuna and the like.

The construction of such reels involves certain problems due to the strains which such reels are called on to sustain and the frictional heat developed in the bearings and the braking system with which reels of this type are provided.

One object of my invention is to provide a reel of the above character in which no strain is placed on the winding gears when the line is running out either freely or against the action of the braking mechanism. Another object is the provision of a dual bearing system for the rotating parts which are alternately operative in the winding and unwinding of the line. A further object is the provision of a braking system which ordinarily is automatically cooled and which in case of necessity may be easily kept cool by merely splashing water on exposed surfaces of the reel. Still other and further objects including a decrease in the number of operating parts, greater working and braking efficiency and easier and surer handling will be apparent from the following description of the details of construction of one embodiment of my invention as set forth in the following specification and the accompanying drawings.

In the drawings,

Fig. 1 is a top plan view of the reel;

Fig. 2 is a side view of the structure shown in Fig. 1;

Fig. 3 is a sectional view on a larger scale substantially on line 3—3 of Fig. 1, the brake mechanism being in tightened position;

Fig. 4 is a sectional view substantially on line 4—4 of Fig. 3;

Fig. 5 is a sectional view substantially on line 5—5 of Fig. 3;

Fig. 6 is a sectional view substantially on line 6—6 of Fig. 3; and

Fig. 7 is a fragmentary sectional view showing the brake nut in loosened position.

Referring to the drawings, the frame of the reel is shown as formed of side members 1 and 2 secured to rod butt and rod tip receiving members 3 and 4 respectively, by machine screws 5. Intermediate the members 3 and 4 the side members are connected by spacing rods 6 held in place by machine screws 7 (see Fig. 3).

A shaft 10 is rotatably mounted in the end members by means of ball bearings 11 and the reel spool 12, which includes hubs 13 to which are secured flanges 14, is rotatably mounted on shaft 10 by means of ball bearings 15. As will be more fully hereinafter described, shaft 10 is held stationary in bearings 11 when the line is running out, the spool turning on shaft 10 through bearings 15. When the line is wound in shaft 10 turns in bearings 11, the spool and its bearings 15 then turning with the shaft 10.

Shaft 10 is adapted to be driven in a direction to reel in the line by a crank 16 secured to the hub of a gear 18 journaled in a bearing 19 formed in side member 2 and a bearing 20 secured to side member 2. The bearings are adapted to be lubricated by means of an axial duct 21 formed in the gear. Gear 18 meshes with a gear 22 having a squared central opening fitting on the squared end portion 24 of shaft 10 and secured thereon by screws 23. Reverse rotation of shaft 10 is prevented by a ratchet 25 fitted on the squared portion 24 of shaft 10 and engaged by pawls 26 (see Fig. 5) pivoted at 27 to end member 2. The pawls 26 are pressed into engagement with the teeth of the ratchet by springs 28.

The spool 12 is adapted to be clamped to shaft 10 to be rotated thereby in a direction to reel in the line by means of brake mechanisms positioned at each end of the spool which brakes also serve, when tightened to a degree short of a clamping action, to apply a variable load against the outward movement of line.

The brake shown at the right hand end of the shaft 10 as viewed in Fig. 3 comprises two annular disc members 30, formed of any suitable brake lining material, which are provided near their peripheries with openings fitting on dowels 31 (see Figs. 3 and 4) secured to the outer face of the adjacent spool flange 14, whereby the discs 30 turn with the spool. A metal plate 32 is positioned between the discs 30 and is formed with a square central opening fitting on squared portion 33 of shaft 10 whereby said plate revolves with (or remains stationary with) shaft 10. A metal collar 35 is also fitted on squared portion 33 of the shaft between the outer disc 30 and gear 22.

The brake unit at the left hand end of the shaft 10 as viewed in Fig. 3 is essentially similar to the unit just described. As shown disc members 40, similar to discs 30, are fitted on dowels 41 (see also Fig. 6) carried by the spool flange 14 to turn therewith. A metal plate 42 is positioned between discs 40 and is formed with a squared central opening fitting on a squared member 43 pinned to the shaft 10. A metal disc 45 is also fitted on squared member 43 and extends slightly beyond the member 43. A washer 46 engages between the outer face of disc 45 and bearing 11.

The adjacent end of shaft 10 is threaded at 48 to receive a brake actuating hand nut 49 provided on its inner face with a cylindrical ferrule 50 upset at its free edge to retain a ball thrust bearing 51 adapted to engage a reduced portion 52 of bearing 11, the latter bearing being held against outward movement by a retaining collar 53 secured to end member 1 by screws 54. Side member 2 is provided with a plate 55, covering bearing 11 and secured to end member 2 by screws 56.

As will be obvious when nut 49 is turned inwardly into engagement with bearing 11 the various brake discs at both ends of the shaft are drawn together into increasing frictional engagement. Up to the point where the spool is thus clamped to the shaft the brakes act as a drag on the rotation of the spool about the shaft and the degree of resistance offered by the brakes is responsive to the position of nut 49.

Since shaft 10 is prevented by pawls 26 from rotating in a direction to pay out the line when the grip of the brake discs equals or exceeds the pull on the line, the line is held from outward movement and rotation of shaft 10 by crank 16 in the opposite direction will carry the spool with it to reel in the line. When the nut 49 is backed off as shown in Fig. 7, substantially no restraint is placed upon the rotation of the spool, and the line will run out freely. A cap screw 57 prevents nut 49 from inadvertently being turned off of the shaft.

A rod butt 60 and rod top 61 of suitable form are inserted in members 3 and 4 respectively. As best shown in Fig. 2 the longitudinal center lines of both the butt and rod tips pass substantially through the center of the reel and this arrangement adds to the ease in handling the equipment.

It will be noted that the braking discs are positioned against or closely adjacent the outside faces of spool flanges 14 which are relatively thin, and heat generated in the brakes is dissipated by the spool flanges which are automatically kept cool by the wet line. If necessary the spool may be further cooled by merely splashing it with water. Bearings 11 are idle when the line is running out and bearings 15 are at rest when the line is being reeled in. This alternate operation of two sets of bearings prevents overheating and sticking of the reel. It further makes it possible to relieve the driving mechanism of all strain except when it is in actual operation.

I claim:

1. A fishing reel comprising a frame including side members, ball bearings mounted in said side members, a shaft rotatably mounted in said bearings, spaced ball bearings carried by the shaft, a flanged spool rotatably mounted on said spaced bearings, a crank supported by one of the end members and geared directly to the shaft to drive the latter in the line winding direction, a pawl and ratchet connection between the shaft and one of the side members to hold the shaft against reverse rotation, a plurality of friction discs connected to the spool flanges and cooperating with friction discs slidably but non-rotatably mounted on the shaft between the adjacent shaft and spool bearings, and a hand operated nut threaded on that end of the shaft opposite the driven end and acting against the adjacent shaft bearing to draw said discs into the desired degree of frictional engagement to selectively retard the free rotation of the spool on the shaft or to lock the spool to the shaft for rotation therewith.

2. A fishing reel comprising a frame including side members, bearings mounted in said side members, a shaft rotatably mounted in said bearings, spaced bearings carried by the shaft intermediate the first named bearings, a flanged spool mounted on said spaced bearings, a crank supported by one of the end members and geared directly to the adjacent end of the shaft to drive the latter in the line winding direction, means to hold the shaft against rotation in the reverse direction, friction discs carried by each spool flange and cooperating with friction members slidably but non-rotatably mounted on the shaft intermediate the adjacent shaft and spool bearings, and a hand operated nut, threaded on that end of the shaft opposite the driven end, to draw said discs into variable frictional engagement to selectively retard the free rotation of the spool on the shaft or to frictionally lock the spool to the shaft for rotation therewith.

3. A fishing reel comprising a frame including side members, bearings mounted in said side members, a shaft rotatably mounted in said bearings, spaced bearings carried by the shaft intermediate the first named bearings, a flanged spool mounted on said spaced bearings, a crank supported by one of the end members and geared directly to the adjacent end of the shaft to drive the latter in the line winding direction, means to hold the shaft against rotation in the reverse direction, dowels extending outwardly from each flange of the spool, a plurality of friction discs mounted on said dowels, a plurality of friction discs non-rotatably mounted on the shaft intermediate the adjacent shaft and spool bearing and interengaging with the discs carried by the spool flanges, and a hand-operated nut, threaded on that end of the shaft opposite the driven end to draw said discs into variable frictional engagement to selectively retard the free rotation of the spool on the shaft or to frictionally lock the spool to the shaft for rotation therewith.

ELWIN L. KNOWLES